Patented Oct. 8, 1946

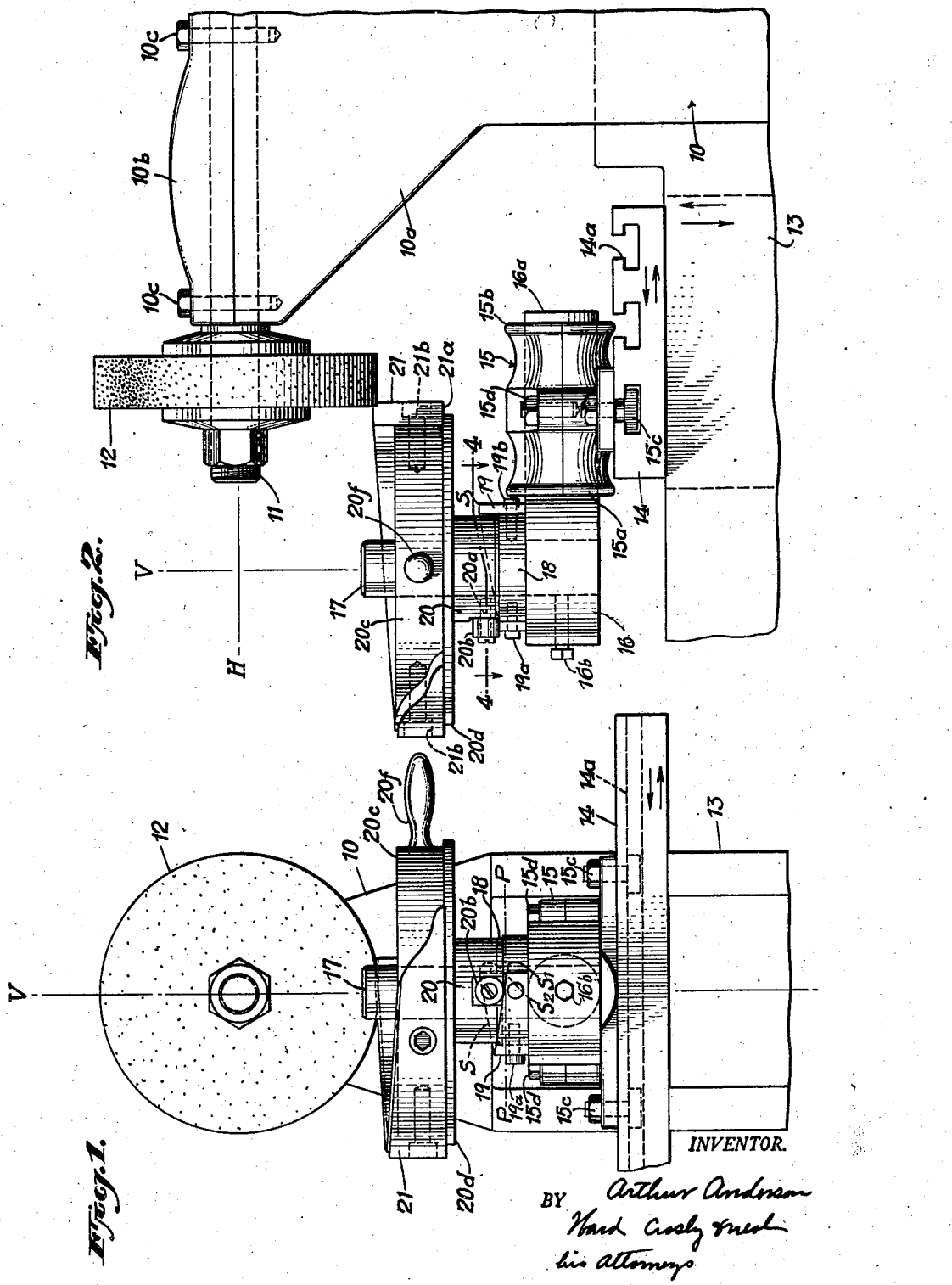

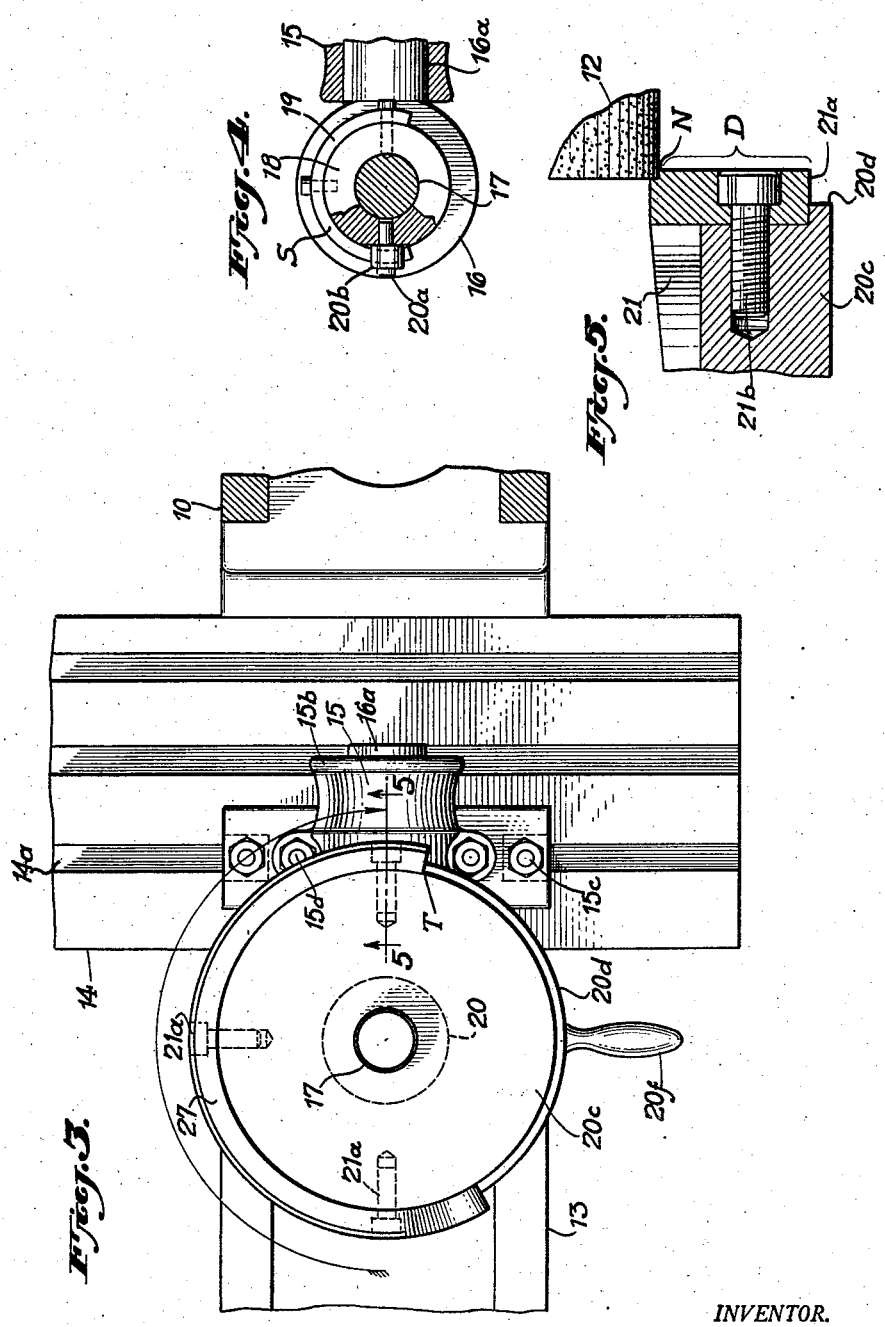

2,408,722

UNITED STATES PATENT OFFICE 2,408,722

APPARATUS FOR FORMING CAM SURFACES UPON CYLINDRICAL CAM BODIES

Arthur Anderson, Brooklyn, N. Y.

Application April 7, 1945, Serial No. 587,126

1 Claim. (Cl. 51—101)

My invention relates to apparatus for forming a cam surface upon a cam body of the cylindrical type and, more particularly, to a device adapted to be used as an attachment for a grinder, or the like metal removing machines, so as to convert the grinder into apparatus especially useful in refinishing worn cams.

It is an object of the invention to provide a simple device for accurately positioning and feeding a cylindrical cam body to a cutting tool for forming a cam surface having a desired degree of rise for a given arcuate length.

It is a further object of the invention to provide apparatus capable of using a given master cam or template for operating upon a plurality of cams of different sizes to produce the same rise per degree of circumference as that of the master cam or template.

It is a further object of the invention to provide a sturdy, low-cost device which may be readily attached to and used in conjunction with a grinding machine, milling cutter, planing machine, or the like for forming a cam surface on a cylindrical cam.

It is a further object of the invention to provide a device for forming cam surfaces upon respective cam bodies of various sizes, both as to diameter, thickness of face and extent of rise.

Other objects, advantages and features of the invention will become apparent from the following detailed description taken in conjunction with the appended drawings, in which:

Fig. 1 is a front elevational view showing my novel device as adapted more especially for operation with a grinding machine;

Fig. 2 is a side view of the device shown in Fig. 1;

Fig. 3 is a top view of the device as shown in Fig. 2 with certain parts of the grinder omitted for clarity;

Fig. 4 is a sectional view, taken along the line 4—4 of Fig. 2, with certain parts broken away; and Fig. 5 is an enlarged sectional view taken along the line 5—5 of Fig. 3, and showing the grinding wheel which is omitted in Fig. 3.

Referring more particularly to Figs. 1 and 2, I have shown, as one form of a cutting machine, a grinding machine 10 of conventional form comprising a frame 10a providing a journal having a removable cap 10b suitably secured thereto as by bolts 10c, 10c and serving to rotatably support a shaft 11 having a grinding wheel 12 suitably secured thereto for rotation about its horizontal axis H by any suitable source of power (not shown). The grinding machine 10 further comprises a vertically-adjustable supporting bed 13 which is suitably secured to the frame 10a and carries a work table 14 which is movable both longitudinally and transversely with respect to the horizontal axis H of grinding wheel 12. As shown best in Fig. 2, the work table 14 is provided with transversely-extending T slots 14a. Thus far, I have referred to pertinent features of a typical well-known surface grinder. It is to be understood, however, that I do not limit myself to the particular type of grinding machine shown as the invention is applicable to various types of grinding machines or even in its broader aspects, to planing or milling machine as will more fully appear hereinafter.

According to the present preferred form of the invention, a split pillow block 15 comprising a lower section 15a and an upper section 15b is rigidly secured to the work table 14 by means of T bolts 15c, 15c the heads of which are disposed within one of the slots 14a. The upper section 15b of the pillow block 15 is clamped to the lower section 15a by bolts 15d, 15d thus defining a tubular bore in which is rigidly held a cylindrical extension 16a of a supporting base 16. To assure the unitary rigidity of the base 16 and block 15, a flush head set screw (not shown) preferably is screwed upwardly through the lower block section 15a and into engagement with the cylindrical portion 16a. The base or bottom flange of the lower pillow block member 15a is provided with a lower surface disposed in a plane at right angles to the axis V, and accordingly when the device is held in position on a horizontal bed such as 14 the axis V is vertical. Carried by the base 16 is a cylindrical stub shaft 17, the axis V of which is vertical at all times. For convenience the shaft 17 is made as a separate member snugly seated in a bore in the base 16 and rigidly locked thereto by a screw 16b.

A collar 18 encircles the cylindrical member 17 and is supported by the base 16 for removably holding a master cylindrical cam or template 19. The template 19 is rigidly held on the collar 18 by screws 19a, 19b and one of these screws, such as 19b, extends through the collar 18 and engages the cylindrical member 17 to thereby rigidly secure the template to the shaft 17 while permitting ready adjustment of the template angularly.

As is apparent from Fig. 4, the template 19 has a substantially semi-circular configuration. However, the angular extent of the template 19 may vary from a portion of a quadrant to 360 degrees, depending upon the arcuate extent of the cam surface to be formed, without departing from the spirit and scope of the invention. The template 19 has an inclined upper surface S, Fig. 1, the lowest portion thereof being at $S_1$ and the highest portion at $S_2$. For convenience, a horizontal plane P, P passing through $S_1$ may be considered as a reference plane. Those skilled in the art will recognize that the "rise" at any portion of the upper cam surface S is its vertical distance above the horizontal plane P, P and the vertical distance of the upper cam surface S from the plane P, P at $S_2$ is the total rise of the cam. Similarly, the rise per degree of circumference of the template 19 is the difference in elevation of two points upon the cam surface S which are separated by an angular distance of one degree.

Rotatably mounted upon the cylindrical member 17 is a work carrier 20 having a horizontally-extending stub-shaft 20a, Fig. 2, upon which is journalled a roller 20b engaging the upper surface S of template 19. The work carrier 20 is movable axially with respect to the cylindrical member 17, this axial motion being controlled by the height or rise of the upper surface S of the master cam 19. The upper portion 20c of the work carrier 20, Figs. 2 and 4, is circular and has a flange 20d upon which is carried the base 21a of a cylindrical cam body 21 which is to be provided with the proper contour as determined by the shape of the template 19. The cam 21 is firmly secured to the work carrier 20 in any suitable manner as, for example, by screws 21b, 21b, the center of the cam 21 being disposed upon the axis of rotation of the work carrier 20. While the invention is intended especially for the regrinding of worn cams it is within the contemplation of the invention that it may be used to initially cut or form a new cam surface in which case the cam body 21 takes the form of a suitable cam blank. The work carrier 20 is provided with a handle 20f by which it may be rotated about the cylindrical member 17. Thus, as best shown by Fig. 1, it will be apparent that, as the work carrier 20 is rotated, the roller 20b moves along over the upper surface S of the master cam 19 with the result that the work carrier 20 moves vertically in accordance with the degree of rise of the upper surface S of cam 19. In other words, as the work carrier 20 together with the roller 20b is rotated through an angle of one degree, for example, said work carrier 20 moves a vertical distance equal to the rise per degree of circumference of the template 19. It will be apparent that cams of any desired diameter or thickness or height may be resurfaced or cut by choosing a suitable work carrier 20, the upper portion 20c and flange 20d of which conform to the inner and lower surfaces, respectively, of the cam body 21.

*Operation*

Referring to Fig. 2, with the parts assembled as previously described, the work table 14 is moved transversely with respect to the axis H of grinding wheel 12 until the vertical axis V of the cylindrical member 17, on which the centers of the template 19 and cam body 21 are disposed, intersects the horizontal axis H of the grinding wheel 12. The work table 14 is then moved longitudinally with respect to the axis H until the grinding wheel 12 is in position to make a cut of the desired width upon the cam body 21, Fig. 5. Thus, it will be apparent that I prefer to grind away the worn or rough surface of the cam body 21 by increments, only a small portion being ground away at each cut. However, under some conditions, the whole width of the upper surface of cam 21 may be ground away at one cut.

The supporting table 13, Fig. 2, is then vertically adjusted to give the desired depth of cut which is kept as shallow as possible to conserve the metal of the cam surface. Preferably, the cam 21 is rotated to such a position during this operation that the grinding wheel 12 does not engage the surface of cam 21.

The grinding wheel 12 is then rotated at a high rate of speed and the work carrier 20 together with the cam 21 are rotated by the handle 20f, for example, in a clockwise direction, Fig. 3. As the highest portion T of the upper surface of cam 21 comes into engagement with the grinding wheel 12, the roller 20b is in engagement with a relatively low portion, for example $S_1$, of the upper surface S of template 19, Fig. 1. As rotation of the work carrier 20 continues through an angle of one degree, for example, the roller 20b travels along the upper surface S of template 19 whereby the work carrier 20 together with the cam 21 moves vertically upward with respect to the grinding wheel 12 a distance equal to the rise per degree of the template 19. Accordingly, as the cam 21 is rotated, the vertical distance D, Fig. 5, of the newly-ground surface N of cam 21 from the base 21a thereof decreases in accordance with the rise of template 19. As the cam 21 is rotated through an angle of one degree, for example, the distance D decreases a distance equal to the rise per degree of circumference of the template 19. Rotation of the work carrier 20 is continued until the whole circular length of the upper surface of cam 21 has been ground away, the newly-ground cam surface N thus having the same rise per degree of circumference as the template 19.

The work table 14 together with the cam 21 are moved to the right, Figs. 2 and 5, and another portion of the cam surface of the cam 21 is ground away by rotation of the work carrier 20 together with the cam 21 by the handle 20f. This adjustment of the work table 14 and grinding are continued until the whole width of the surface of cam 21 has been ground. In this manner, I obtain a reground cam surface having the same rise per degree of circumference as the template 19, and the finished surface is accurately horizontal in a radial direction throughout its arcuate length. Also a smooth ground finish is provided, not obtained by any other method, consequently prolonging the life of the cam.

It will be obvious to those skilled in the art that the grinding wheel 12 could be replaced by a milling cutter or a planing tool without departing from the spirit and scope of the broader aspects of my invention. Therefore, it is to be understood that the term "metal removing tool" in the appended claims is descriptive of a grinding wheel, milling cutter, planing tool, and the like. It will further be apparent that while the invention is intended especially for use in refinishing cylindrical cams of the type used in single and multiple automatic screw machines, the surface of the template 19 could be of a different or irregular contour, if it is desired to provide a cam whose active surface is of such different or irregular shape.

While the invention has been described with respect to a presently preferred embodiment which has given satisfactory results, and certain modifications have been referred to, it will be understood by those skilled in the art, after understanding the invention, that various other changes and modifications may be made without departing from the spirit and scope of the invention and it is intended, therefore, in the appended claim to cover all such changes and modifications as fall within the scope of the invention.

I claim:

In apparatus comprising a rotatable grinding wheel for forming a cam surface wherein a work table is movable in a direction normal to the axis of said grinding wheel, said work table being adjustable longitudinally and transversely with respect to said axis, the combination with said apparatus of a detachable fixture including a base rigidly secured to said table and providing a vertically extending cylindrical portion constructed and arranged for the insertion thereover of a surrounding arcuate template, said base also providing a cylindrical bearing portion having a vertical axis of rotation coincident with the axis of said arcuate template, said detachable fixture also including a work carrier journaled on said base for movement radially and longitudinally of said vertical axis, said work carrier comprising a cylindrical portion concentric with said vertical axis for rigidly holding a cam body on the outer periphery thereof, and a template follower secured to said carrier for engagement with said template.

ARTHUR ANDERSON.